United States Patent [19]

Suzuki et al.

[11] 4,271,245
[45] Jun. 2, 1981

[54] GRID BASE PLATE FOR AN ELECTRODE PLATE FOR A STORAGE BATTERY AND METHOD OF MANUFACTURE THEREOF

[75] Inventors: Yuichi Suzuki; Ichiro Sano, both of Yokohama, Japan

[73] Assignees: Furukawa Denchi Kabushiki Kaisha; Furukawa Denki Kogyo Kabushiki Kaisha, both of Yokohama, Japan

[21] Appl. No.: 129,837

[22] Filed: Mar. 13, 1980

[30] Foreign Application Priority Data

Aug. 17, 1979 [JP] Japan ................................ 54-104042

[51] Int. Cl.³ ............................................ H01M 4/74
[52] U.S. Cl. .................................................. 429/243
[58] Field of Search ..................... 429/241, 243, 244; 29/2

[56] References Cited

U.S. PATENT DOCUMENTS 2,066,663  1/1937  Zachlin ................................ 429/241

Primary Examiner—Charles F. LeFevour
Attorney, Agent, or Firm—Haseltine and Lake

[57] ABSTRACT

A grid base plate and its method of manufacture comprising intermittently conveying a thin elongated metallic sheet longitudinally in one direction through successive first, second and third stations, the sheet being stopped in each of the stations between successive conveying steps. In the first station, the sheet is bent to form a peripheral upwardly projecting portion in a frame region surrounding an inner grid region. In the second station, a plurality of openings are punched in the grid region and in the third station, the sheet is punched along an outer peripheral edge surface to separate the base plate from the sheet. The upwardly projecting portion forms a space with the grid region which is filled with an active material of a thickness determined by the height of the upwardly projecting portion. The upwardly projecting portion has an outer bend region with an end surface constituting a peripheral edge of the frame which faces laterally outwards and is disposed vertically. The outer bend region has a lower surface disposed in the same horizontal plane as a lower surface of an inner region in the vicinity of the juncture of the projecting portion and the grid region. Thereby, when the base plate is placed on a horizontal planar surface, the peripheral frame region will rest on the horizontal surface along two lines of contact respectively at the bottom of the edge surface and at the lower surface at the juncture of the frame region and the grid region.

5 Claims, 11 Drawing Figures

GRID BASE PLATE FOR AN ELECTRODE PLATE FOR A STORAGE BATTERY AND METHOD OF MANUFACTURE THEREOF

FIELD OF THE INVENTION

This invention relates to a press-punched type base plate for electrode plates for batteries, such as a lead storage battery or the like, which is improved in its paste filling property of active material and in its productivity.

PRIOR ART

The inventors have previously proposed, instead of a cast type grid base plate, a press-punched type grid base plate suitable for batteries, such as a lead storage battery or the like, in which a grid frame surrounding a grid surface region is formed, by bending, into a window frame so that an active material may be filled thickly therein. (Japanese Utility Model Registration No. 1,276,247 U.M. Publication No. 30979/Showa 53 (1978)).

In the foregoing publication, there are disclosed three embodying examples of the punched type grid base plates of this kind having respective peripheral projecting frames which are varied in their sectional forms. It has been found that all of the grid base plates with those sectional forms of the respective peripheral projecting frames have deficiencies as will be described below with reference to FIGS. 1-3.

Namely, the peripheral projecting frame A of the grid base plate shown in FIG. 1 comprises a bent portion a of arc sectional form projecting from the plane of one side of the plane of a grid surface region B. The portion a is formed by bending and an outer peripheral edge b thereof is extended to project towards the other side of the plane of the grid surface region B and beyond an inner peripheral base edge c of the projecting frame A, so that there is formed around the grid surface region B the peripheral projecting frame A of height T as determined by the distance between the bottom of the bent portion a and the end surface d of the outer peripheral edge b. Consequently, there is formed on the grid surface region a space f to be filled with an active material of a thickness corresponding to the height T.

The peripheral projecting frame A of the grid base plate shown in FIG. 2 comprises two bent portions a, a of arc sectional form defining an S shape on opposite sides of the plane of the grid surface region B. An end surface d of an outer peripheral edge b is directed upwards, so that the height T of the peripheral frame A is the distance between the crest of the upper and lower bent portions a, a, and consequently there is formed on the grid surface region B a space f to be filled with the active material of a thickness corresponding thereto. The grid base plate shown in FIG. 1 is a single point support type supported singly by either the bent portion a of the end surface d of the outer peripheral edge b. The grid base plate shown in FIG. 2 is also a single point support type which is supported singly by either of the two bent portions a, a.

Consequently, each of the plates is deficient in that the peripheral projecting frame A is comparatively weak in withstanding pressure applied thereto at the time when the base plate is filled with an active material by an automatic active material paste-filling machine, and is subject to deformation, elongation, breakage or the like, resulting in a loss in manufacture of active material filled grid base plates. Additionally, there can be a change in the predetermined height T, and consequently there is brought about an inequality in the amount of filling of the active material. These unfavorable results are especially evident since the grid base plate is usually very thin and particularly when a soft metal, such as lead or lead alloy, is used as the plate material. Additionally, in the embodiment shown in FIG. 2, the outer peripheral edge b of the projecting frame A which is bent in the form of S, is directed upwards, so that on filling of the active material, a groove e in the form of U is subject to filling with active material resulting in waste thereof.

The peripheral projecting frame A of the grid base plate shown in FIG. 3 comprises a bent portion a in a semicircular sectional form and end surface d of the outer peripheral edge b thereof is positioned in the same horizontal plane as an inner peripheral edge base portion c. Accordingly, the filling of the active material is carried out under the condition that the grid base plate is supported by two point supports, that is, by the inner peripheral edge base portion c and the end surface d, and a deformation or the like of the peripheral projecting frame by the pressure applied thereto at the time of filling the active material can be prevented. However, from a practical point of view, it is difficult to obtain, by bending by means of a press machine, the peripheral projecting frame A in the semicircular sectional form as shown in FIG. 3, from a horizontal outer peripheral frame (shown by broken lines in FIG. 4) of a punched base plate, and it is inevitable in practice that the horizontal outer peripheral frame is usually bent into a shape in which the end surface d of the outer peripheral edge b thereof is positioned higher than the inner peripheral base edge c, that is, in a floated position as shown in solid lines in FIG. 4. Namely, the grid base plate becomes, in practice, a single support type as shown in FIG. 4, and in actual fact there is producted deformation, fluctuation in height, breakage or the like of the raised bent portion a by the pressure applied thereto during filling of the active material by the paste filling machine. Furthermore, the base plate with the projecting frame of the shape as shown in FIG. 1 or 3 is such that the end surface d of the outer peripheral edge b is directed in the vertical direction, so that it has various disadvantages as described below. Namely, when the base plate is placed on a conveying belt, such as of woven fabric or the like, and is conveyed toward the automatic paste filling machine, it often happens that the base plate is caught in the belt and thus the conveying thereof is not carried out smoothly. Furthermore, the base plate is liable to be deformed by impact force imparted to the side surface thereof, and additionally, when the base plate and a separator are put upon one another at the time of assembling a group of electrode plates, the end surface d strikes against the separator and is liable to break the same.

SUMMARY OF THE INVENTION

An object of this invention is to provide a punched grid base plate for electrode plates for batteries, such as a lead storage battery or the like, by which the foregoing disadvantages of the conventional grid base plates are eliminated and especially variation in the filling amount of the active material is substantially decreased, and any deformation or breakage of the peripheral projecting frame is greatly overcome, and further, the productivity of acceptable electrode plates filled with active material is improved.

According to this invention, in a grid base plate for an electrode plate for a battery of the type comprising a grid surface region having a large number of openings and a peripheral projecting frame which surrounds the grid surface region and is bent to project upwards in the form of an inverted U in section, there is produced, on the grid surface region surrounded by the peripheral projecting frame, a space to be filled with active material of a thickness determined by the height of the peripheral projecting frame, the improvement wherein the outer peripheral edge of the peripheral projecting frame is formed with a bent outer edge whose end surface is directed laterally outwards, the lower surface of the bent outer edge being positioned in the same horizontal plane as the lower surface of an inner peripheral base edge of the peripheral projecting frame.

DETAILED DESCRIPTION

Figure 1:
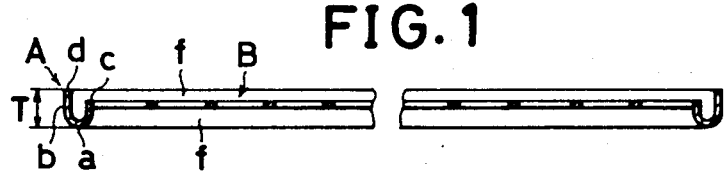
FIGS. 1 to 4 are sectional views of conventional grid base plates.
Figure 2:
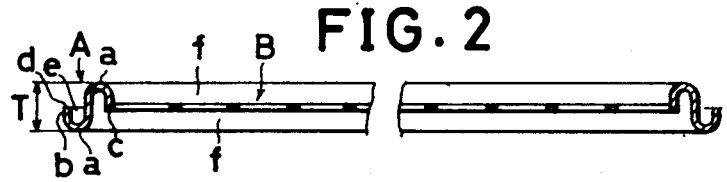
Figure 3:
Figure 4:
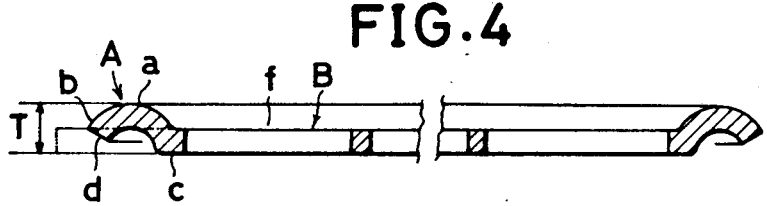
Figure 6:
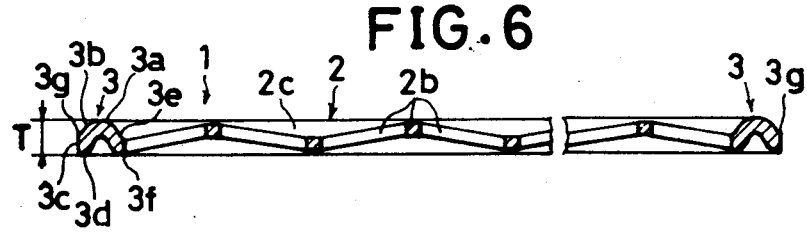
FIG. 6 is a sectional view taken along line VI—VI in FIG. 5.
Figure 5:
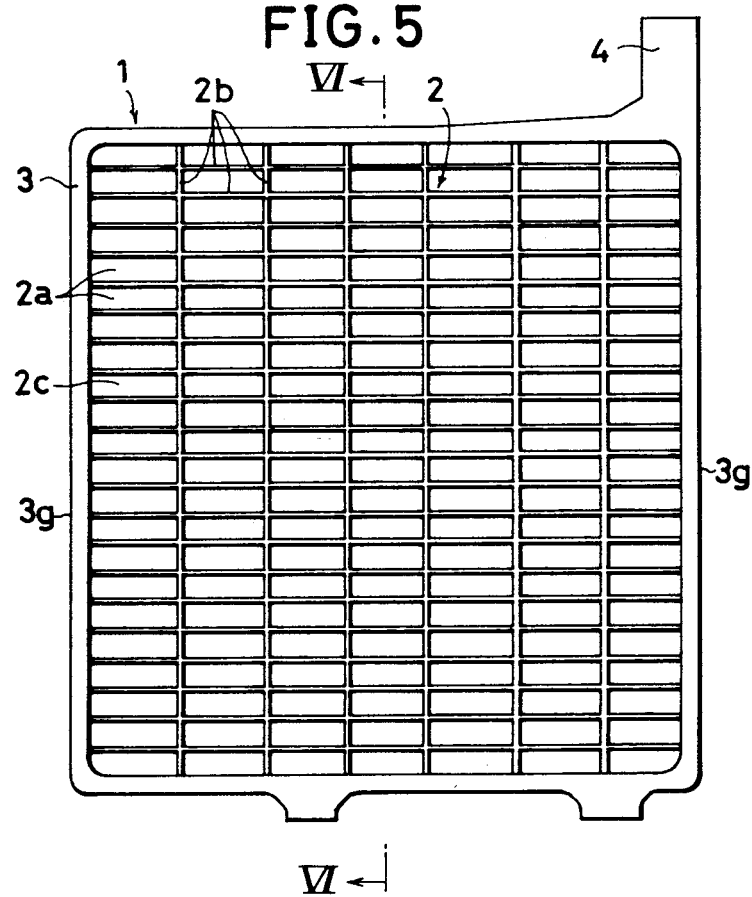
FIG. 5 is a top plan view of a grid base plate of one embodiment according to this invention.
Figure 7:
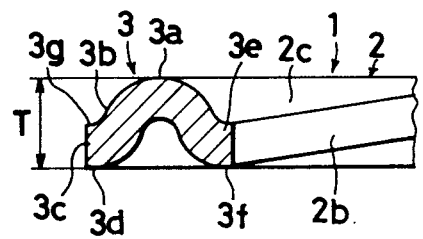
FIG. 7 is an enlarged sectional view of a portion of FIG. 6.

Referring to FIGS. 5 to 7, numeral 1 denotes a grid base plate of the invention for an electrode plate for a lead storage battery which is obtained, by pressing and punching, from a belt-shaped thin metallic sheet, namely, a belt shaped sheet of lead or lead alloy of a thickness in the range of from 0.3 mm to 2 mm and usually from 0.5 mm to 1.5 mm. The grid base plate 1 comprises a grid surface region 2 which is composed of a large number of longitudinal and transverse grid members 2b formed by punching a large number of holes 2a in the plate, and a peripheral projecting frame 3 which surrounds the grid surface region 2 and is formed, by bending, to project upwards by a press operation such as embossing, bending or the like. The base plate 1 has a tab 4 projecting horizontally outwards from the side thereof and formed by punching at a corner of the peripheral projecting frame 3.

A predetermined height T of the base plate is obtained by the bent peripheral projecting frame 3, and thereby a space 2c to be filled with a pasty active material of a predetermined thickness is produced within the frame 3, that is, on the grid surface region 2. The formation of the grid base of FIGS. 5–7 is different from that of the conventional grid base plate. According to the invention, the sectional shape of the peripheral projecting frame 3 is formed as described below. Namely, as shown clearly in FIG. 6 and especially in FIG. 7, the peripheral projecting frame 3 is formed, at the middle portion in the width direction thereof and along the longitudinal direction thereof, with an upwardly projecting portion 3a which is generally characterized as being of inverted U-shape which is taken to include other inverted shapes such as V-shape. The inverted U-shape as shown in FIGS. 6 and 7 is rounded in cross-section and has an outer peripheral edge 3b joined to a short horizontal margin portion 3g formed with an outer end surface 3c directed laterally outwards and horizontally. The outer margin 3g has a short horizontal lower surface 3d which is disposed in the same horizontal plane as an inner peripheral edge of the peripheral projecting frame 3, i.e., horizontal lower surface 3f of inner peripheral base edge 3e which is adjacent the peripheral surface of the grid surface region 2. Thus, the peripheral projecting frame 3 of the invention is formed with two-point supports, namely, one support is at the horizontal lower surface 3d and the other support is at the horizontal lower surface 3f, and consequently, the frame 3 can sufficiently withstand the pressure applied thereto at the time of filling of the active material paste therein, and hence, will not undergo any fluctuation in height, deformation or breakage, whereby passage thereof through a paste filling machine can be carried out smoothly. Consequently, there can be obtained an excellent grid base plate correctly filled with active material of predetermined amount.

Figure 8:
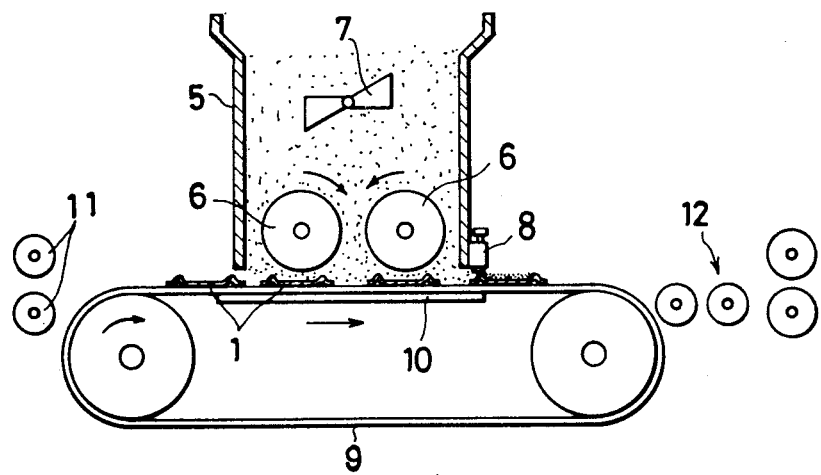
FIG. 8 is a sectional side view of an automatic paste filling machine.

The grid base plate of the invention is filled with the active material paste using a conventional automatic paste filling machine as shown in FIG. 8. Referring thereto, numeral 5 denotes a charging hopper for the active material paste, numeral 6 denotes a pair of paste applying rollers mounted within the hopper, numeral 7 denotes a stirrer, numeral 8 denotes an adjustable squeezing member, numeral 9 denotes an endless belt of woven fabric for conveying the grid base plates 1 in sequence below the charging hopper 5, numeral 10 denotes a supporting plate for supporting the upper run of the endless belt at the lower surface thereof, numeral 11 denotes a pair of guide rolls for supplying the grid base plates at the inlet end and numeral 12 denotes a group of conveying guide rolls on the delivery side for delivering the paste-filled grid base plates.

In the case of the grid base plate of the invention, due to the particular shape of the projecting frame 3 thereof, in the course of the paste filling operation by the charging machine, the base plate will not become caught by the woven conveying belt 9 or by the squeezing member 8 or the like so that the conveying of the plates would become obstructed or the peripheral projecting frame 3 thereof strike the machine and thereby become deformed or broken. In contrast thereto, in the case of the conventional type base plate, due to the one point support of the projecting frame, the foregoing disadvantages, such as deformation or the like by the pressure or the like, frequently take place.

The grid base plate and the conventional one point support type grid base plate were filled with the active material by the paste filling machine, and comparison tests were made in respect of variation in the amount of active material filled and in the frequency of deformation and the results are given in the following Table 1.

A sample base plate was 0.8 mm in plate thickness, 1.2 mm in the height of its peripheral projecting frame and 3.5 mm in the width of its projecting frame, and a large number of the base plates were used.

TABLE 1

|  | Variation in filled amount | Frequency of deformation |
| --- | --- | --- |
| Base plates of the invention | ±4% | 0.01% |
| Conventional products | ±6% | 0.3% |

The outer edge of the bent outer edge 3b of the grid base plate of the invention is the short horizontal margin 3g and is not bent back upwards, so that it can prevent the active material from accumulating on the upper surface thereof, thereby avoiding waste of active material.

Additionally, the grid base plate of this invention is formed, as shown in FIG. 6 in which the crosswise grid members 2b are bent in zigzag form within the filling space 2c so as to improve its ability to hold the filled active material.

The grid base plate of the invention can be formed with the particular shape of the peripheral projecting frame by the conventional process in which after a grid base plate of predetermined size and form is separated, by press punching, from a wide metallic material sheet, each of the punched grid base plates thus obtained is subjected one by one to press bending in a press machine so that the peripheral frame thereof may be given the particular shape. It is also possible to manufacture the grid base plates with the particular shaped peripheral frame continuously and directly from a belt-shaped metallic sheet by the process described below.

Figure 9:
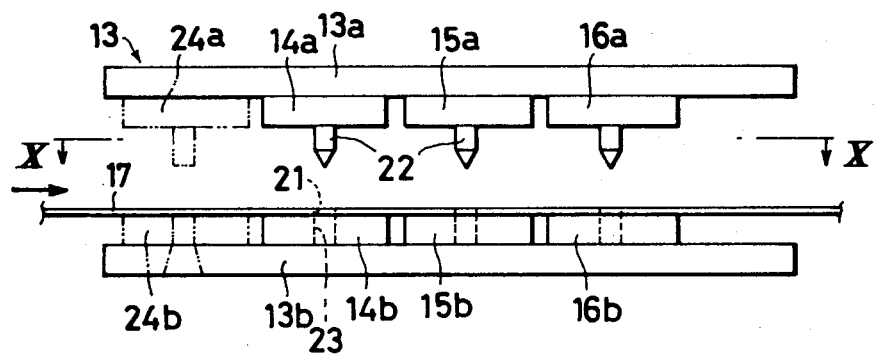
FIG. 9 is a diagrammatic side view of one embodiment of apparatus for carrying out a manufacturing method of this invention.

Namely, the continuous method of manufacturing of this invention grid plate can be carried out using a progressive type press machine 13 as shown in FIG. 9. The machine 13 comprises a long upper movable base 13a and a long lower stationary base 13b which face one another. The upper base 13a is arranged to be opened and closed in relation to the lower base 13b. These upper and lower bases 13a, 13b are respectively provided with a set of upper and lower pressure dies 14a, 14b for forming the peripheral projecting frame, a set of upper and lower punching dies 15a, 15b for punching the window openings, and a set of upper and lower punching dies 16a, 16b for punching dies 16a, 16b for punching the sheet at the surrounding edge of the peripheral projecting frame to obtain a predetermined shape of the punched grid base plate of the invention.

Figure 10:
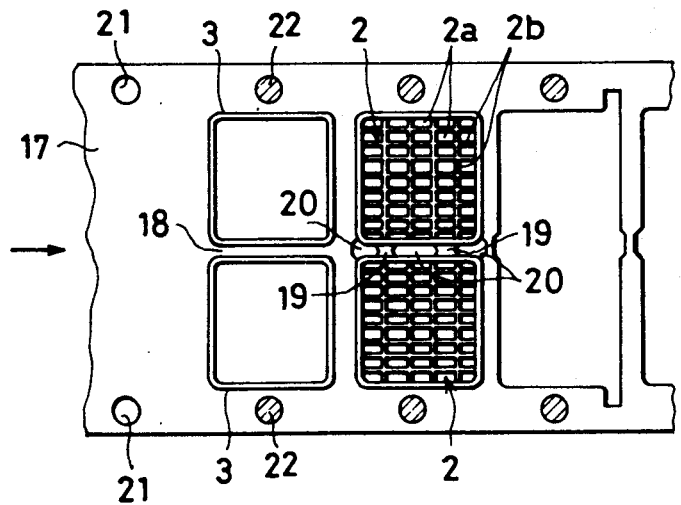
FIG. 10 is a plan view as viewed along line X—X in FIG. 9 for explaining the manufacturing steps.

The belt-shaped metallic sheet 17 is conveyed intermittently in the direction of the arrows in FIGS. 9 and 10 to pass between the upper and lower bases 13a, 13b and along the lower base 13b, the upper base 13a being arranged to be lowered to closed position on the lower base 13b each time when the sheet 17 is stopped.

Thus, as will be clear from FIG. 10, the plate can be manufactured by a sequential process in which the sheet 17 is first subjected to a press operation to form the peripheral projecting frame 3 by the press dies 14a, 14b, and then the grid surface region 2 is formed by punching a large number of window openings 2a in the surface region within the projecting frame 3 by the punching dies 15a, 15b, and then the sheet 17 is subjected to a punching operation by the punching dies 16a, 16b such that an outer peripheral edge of the peripheral projecting frame 3a is separated from the sheet in a region spaced slightly outwards from the inverted U-shaped portion 3a of the projecting frame 3 so that outer margin 3g remains around the projection 3a of the frame 3 and, at the same time, integral tab 4 projects at a corner of the frame 3. These operations are effected continuously in sequence and there can be obtained a large number of grid base plates of this invention with high efficiency and accuracy. Stated otherwise, punched grid base plates with the bent outer edge 3b therearound can be separated from the sheet 17 continuously with high efficiency and accuracy.

In the illustrated process, in order to produce a pair of grid base plates of this invention at one time as shown in FIG. 10, respective additional sets of metallic dies 14a, 14b, metallic dies 15a, 15b and metallic dies 16a, 16b are provided on the upper and lower dies 13a, 13b so that each pair of dies are arranged side by side, in sequence. With this arrangement, the sheet 17 is first formed by the press dies with a pair of peripheral projecting frames 3, leaving a space 18 therebetween, then a pair of grid surface regions 2, are simultaneously formed in the frames by the punching dies. At this time, openings 20 are punched in the space 18 at predetermined intervals, so that left and right leg portions 19 are formed in the space 18. Thereafter, the sheet 17 is subjected to a punching operation by the punching dies 16a, 16b for removing the entire region surrounding the two frames 3 the punching being carried out in the region surrounding the outline of the two formed plates as shown in FIG. 10, so that two punched grid plates are separated from the sheet 17 and remain interconnected by the leg portions 19. Thereafter, the resultant punched plates are separated at the center of the leg portions 19 in a cutting machine (not illustrated), whereby there are obtained two grid base plates of the invention each having a pair of left and right legs 19. This constructive arrangement is advantageous in respect of the manufacturing efficiency of the products according to the invention.

It has been found that if the formation of the grid surface region 2 is carried out before the forming of the peripheral projecting frame 3, deformations at or near the intersections of the peripheral projecting frame 3 and the grid forming members 3b are produced and thus the resultant product has lowered mechanical strength and increased susceptability to corrosion.

In FIG. 10 are shown pin holes 21 made a predetermined regular intervals in the sheet 17 along both side edges thereof, and each time when the conveyed sheet 17 is stopped, fixing pins 22 provided along both side edges of the upper base 13a corresponding to respective pin holes 21 are tightly inserted into the pin holes 21, whereby the sheet is fixed at a predetermined position at the time of the working operations and thus accurate pressing and punching can be effected. Numeral 23 (FIG. 9) denotes pin holes provided in the respective dies of the lower base 13b so that the lower ends of the fixing pins 22 may enter therein. There may be additionally provided, on the upper base 13a and the lower base 13b, a male punching die 24a and a female punching die 24b for producing the pin holes 21 in the sheet 17 as shown in phantom lines in FIG. 9.

Figure 11:
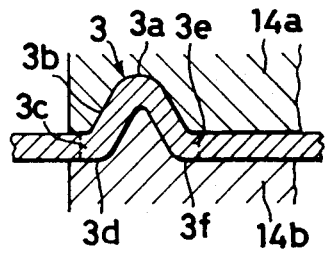
FIG. 11 is a sectional view of a part of a modified embodiment of the grid base plate according to the invention.

If each of the metallic dies 14a, 14b for pressing the sheet is modified so that both side surfaces of the inverted U-shape are formed with straight sides as shown in FIG. 11, release of the sheet 17 from the dies can be carried out favorably.

Thus, according to this invention, the outer peripheral edge of the peripheral projecting frame of the grid base plate is formed with its end surface facing laterally outwards and horizontally and with its lower surface positioned in the same hoirzontal plane as the lower surface of the inner peripheral base edge. Consequently, the obtained grid base plate is stable as a result of its two-point support and it has improved dimensional precision and significantly decreased in fluctuation in height and deformation of the peripheral projecting frame by the pressure at the time of filling of the active material and accordingly in variation in the filled amount of the active material as compared to the conventional grid base plates. Furthermore, the manufacturing loss of filled base plates is decreased, and additionally it becomes possible to manufacture a number of grid base plates continuously directly from a long metallic sheet. Thus, there is higher mass productivity of the grid base plate and improved battery performance, productivity and reduced manufacturing costs especially when the invention is applied to base plates for lead storage batteries for motorcars which are thin and are mass produced.

What is claimed is:

1. A grid base plate for an electrode plate for a storage battery comprising a sheet of material formed with a grid region having a plurality of openings and a peripheral frame region surrounding said grid region, said peripheral frame region being upwardly bent to form an upwardly projecting portion defining, with said grid region, a space filled with an active material of a thickness determined by the height of the upwardly projecting portion of said peripheral frame, said upwardly projecting portion having an outer bend region with an edge surface constituting a peripheral edge of said frame, said upwardly projecting portion having an inner region joined to said grid region, said inner region having a lower surface in the vicinity of the juncture of said inner region and said grid region, said edge surface facing laterally outwards, said outer bend region having a lower surface disposed in the same horizontal plane as said lower surface of said inner region whereby when the base plate is placed on a horizontal planar surface, the peripheral frame region will rest on said horizontal surface along two lines of contact respectively at the bottom of said edge surface and at the lower surface of said inner region.

2. A grid base plate as claimed in claim 1 wherein said upwardly projecting portion has an inverted U-shape in cross-section.

3. A grid base plate as claimed in claim 1 wherein said edge surface of said outer region extends vertically.

4. A grid base plate as claimed in claim 1 wherein said grid region has a zig-zag shape is cross-section.

5. A grid base plate as claimed in claim 4 wherein said grid region includes spaced longitudinal and transverse strips.

* * * * *